United States Patent
Chien et al.

(10) Patent No.: US 8,364,880 B2
(45) Date of Patent: Jan. 29, 2013

(54) INTEGRATED TRANSMISSION CIRCUIT AND METHOD USING A MEDIA ACCESS CONTROL CIRCUIT THAT COLLECTIVELY ENCODES DATA FROM TWO DISTINCT APPLICATION CIRCUITS

(75) Inventors: Chih-Ching Chien, HsinChu (TW);
Tsai-Te Lin, HsinChu (TW);
Chien-Hau Wu, Taoyuan County (TW)

(73) Assignee: Realtek Semiconductor Corp., Hsinchu (TW)

( * ) Notice: Subject to any disclaimer, the term of this patent is extended or adjusted under 35 U.S.C. 154(b) by 425 days.

(21) Appl. No.: 12/563,299

(22) Filed: Sep. 21, 2009

(65) Prior Publication Data
US 2010/0077123 A1    Mar. 25, 2010

(30) Foreign Application Priority Data
Sep. 22, 2008 (TW) ................ 97136373 A

(51) Int. Cl.
*G06F 13/20* (2006.01)
(52) U.S. Cl. .......... 710/313; 710/315; 710/316
(58) Field of Classification Search .......... 710/305–317, 710/8–19, 62–64, 72–74, 31, 36–38
See application file for complete search history.

(56) References Cited

U.S. PATENT DOCUMENTS

| | | | | |
|---|---|---|---|---|
| 6,408,347 B1* | 6/2002 | Smith et al. | | 710/36 |
| 6,556,580 B1* | 4/2003 | Wang et al. | | 370/412 |
| 6,957,283 B2* | 10/2005 | Dhir et al. | | 710/10 |
| 7,574,615 B2* | 8/2009 | Weng et al. | | 713/320 |
| 7,644,194 B2* | 1/2010 | Lindsay et al. | | 710/9 |
| 7,865,744 B2* | 1/2011 | Lee et al. | | 713/300 |
| 7,970,374 B2* | 6/2011 | Riveiro et al. | | 455/402 |
| 2005/0097378 A1* | 5/2005 | Hwang | | 713/320 |
| 2005/0169300 A1* | 8/2005 | Liu et al. | | 370/463 |
| 2006/0168387 A1* | 7/2006 | Gan et al. | | 710/305 |
| 2006/0242341 A1* | 10/2006 | Tsai et al. | | 710/100 |
| 2007/0288681 A1* | 12/2007 | Lee et al. | | 710/315 |
| 2008/0101402 A1* | 5/2008 | Feng et al. | | 370/463 |
| 2008/0201515 A1* | 8/2008 | Birgin et al. | | 710/313 |
| 2009/0028059 A1* | 1/2009 | Barbaresi et al. | | 370/250 |
| 2009/0100280 A1* | 4/2009 | Lindsay | | 713/321 |
| 2009/0248918 A1* | 10/2009 | Diab et al. | | 710/51 |
| 2010/0023668 A1* | 1/2010 | Lee | | 710/301 |
| 2010/0067539 A1* | 3/2010 | Lin et al. | | 370/419 |

FOREIGN PATENT DOCUMENTS

| | | |
|---|---|---|
| CN | 101099325 | 1/2008 |
| TW | 200830813 | 1/1996 |

OTHER PUBLICATIONS

English Abstract for CN 101099325 (Jan. 2, 2008).

* cited by examiner

*Primary Examiner* — Raymond Phan
(74) *Attorney, Agent, or Firm* — McClure, Qualey & Rodack, LLP

(57) ABSTRACT

An integrated transmission circuit and method for transmitting output data to a chipset via a transmission interface are provided. The integrated transmission circuit includes a first application circuit, a second application circuit, a media access control (MAC) circuit, and a physical layer (PHY) circuit. The first application circuit is used for receiving and processing first data to output first processed data. The second application circuit is used for receiving and processing second data to output second processed data. The MAC circuit is coupled to the first application circuit and the second application circuit, and used for encoding the first processed data and the second processed data so as to output encoded data. The PHY circuit is coupled to the MAC circuit to receive the encoded data so as to output the output data to the transmission interface.

20 Claims, 5 Drawing Sheets

INTEGRATED TRANSMISSION CIRCUIT AND METHOD USING A MEDIA ACCESS CONTROL CIRCUIT THAT COLLECTIVELY ENCODES DATA FROM TWO DISTINCT APPLICATION CIRCUITS

CROSS-REFERENCES TO RELATED APPLICATIONS

This non-provisional application claims priority under 35 U.S.C. §119(a) on Patent Application No. 97136373 filed in Taiwan, R.O.C. on Sep. 22, 2008, the entire contents of which are hereby incorporated by reference.

BACKGROUND

1. Technical Field

The disclosure relates to an integrated transmission circuit and method, and more particularly, to an integrated transmission circuit and method for integrating a plurality of application circuits into a chip.

2. Related Art

A Peripheral Component Interconnect Express (PCI Express) is a mature high-speed transmission interface, and has the advantages of low power consumption, high transmission performance, and low pin count.

Currently, most commercially available computer systems (for example, notebook computers or desktop computers), support the PCI Express interfaces. A variety of application circuits such as a 10/100 Mbit Ethernet chip and a Gigabit Ethernet chips may be connected to a chipset of a computer system via PCI Express interfaces. However, in the current state of the art, each application circuit is designed with an exclusive PCI Express interface for connection to the chipset, and the chipset accordingly needs to be designed with a plurality of PCI Express interfaces in consideration of the number of application circuits in a product for coupling the chipset to different application circuits. As a result, the design cost of the chipset is increased. Moreover, if the number of PCI Express ports increases, the size of a computer motherboard must be increased, which is in opposition to the industry aim of lightness and thinness.

SUMMARY

Accordingly, the disclosure is directed to an integrated transmission circuit and method. Through the circuit or method of the disclosure, the number of PCI Express ports to be used is reduced, and the size of a computer motherboard is reduced.

The disclosure provides an integrated transmission circuit for transmitting output data via a transmission interface. The integrated transmission circuit includes a first application circuit, a second application circuit, a media access control (MAC) circuit, and a physical layer (PHY) circuit. The first application circuit is used for receiving and processing first data to output first processed data. The second application circuit is used for receiving and processing second data to output second processed data. The MAC circuit is coupled to the first application circuit and the second application circuit, and used for encoding the first processed data and the second processed data, so as to output encoded data. The PHY circuit is coupled to the MAC circuit to receive the encoded data so as to output the output data to the transmission interface. The MAC circuit collectively (or interactively) encodes the first processed data and the second processed data, so as to output the collectively encoded data to the PHY circuit.

The disclosure also provides an integrated transmission method for transmitting output data via a transmission interface. The integrated transmission method includes: receiving and processing first data to output first processed data; receiving and processing second data to output second processed data; providing an MAC circuit to collectively encode the first processed data and the second processed data so as to output collectively encoded data; and coupling a PHY circuit to the MAC circuit to receive the encoded data so as to output the output data to the transmission interface.

Preferred embodiments and effects of the disclosure are illustrated below with reference to the accompanying drawings.

BRIEF DESCRIPTION OF THE DRAWINGS

The disclosure will become more fully understood from the detailed description given herein below for illustration only, and thus are not limitative of the disclosure, wherein.

DETAILED DESCRIPTION

Figure 1:
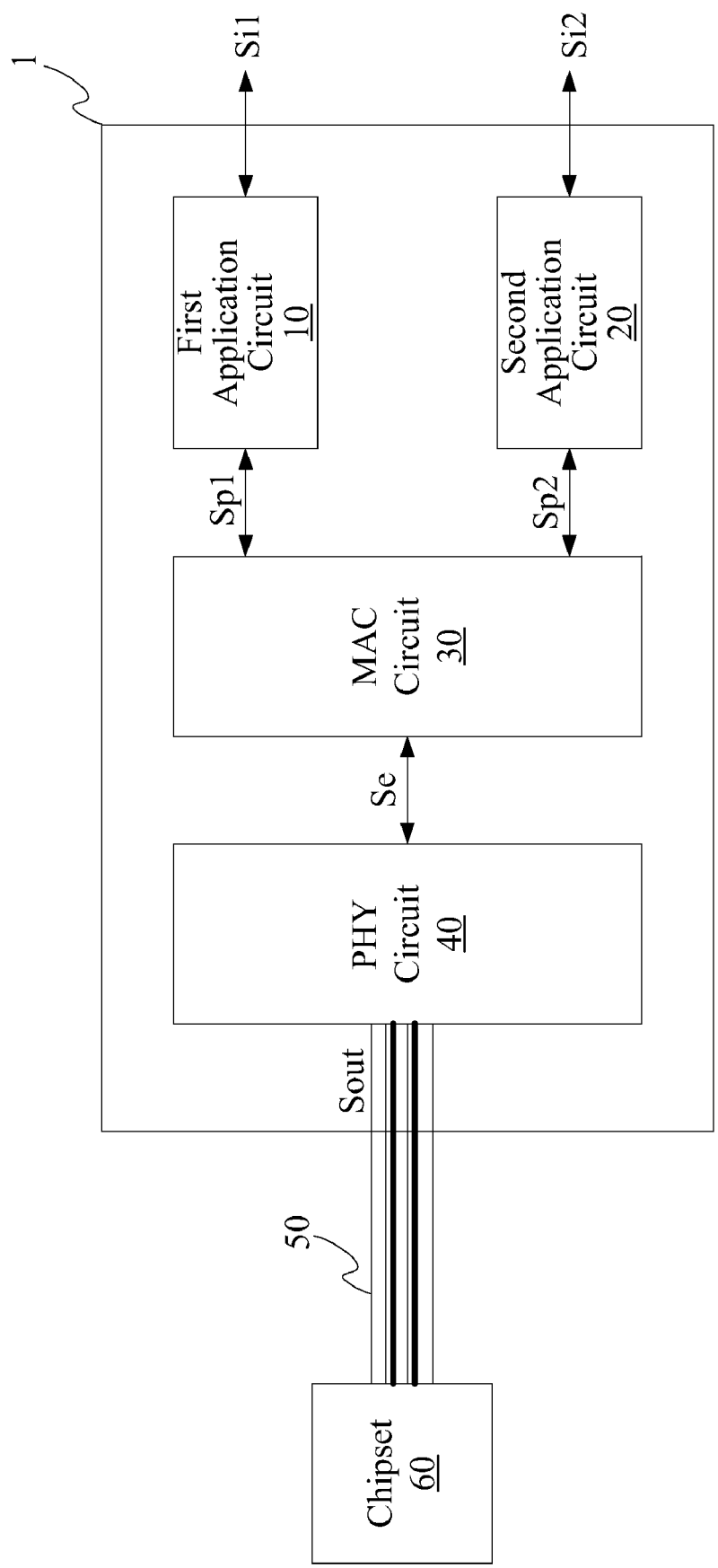
FIG. 1 is a schematic view of an integrated transmission circuit according to a first embodiment of the disclosure.

FIG. 1 is a schematic view of an integrated transmission circuit according to a first embodiment of the disclosure. Please refer to FIG. 1, an integrated transmission circuit 1 of the disclosure is used for transmitting output data via a transmission interface 50, and includes a first application circuit 10, a second application circuit 20, an MAC circuit 30, and a PHY circuit 40.

The first application circuit 10 is used for receiving and processing first data Si1 to output first processed data Sp1. The second application circuit 20 is used for receiving and processing second data Si2 to output second processed data Sp2. In an embodiment, the first application circuit 10 is a card reader, and the second application circuit 20 is a 10M/100M/Gigabit Ethernet controller. Alternatively, the first application circuit 10 is an Ethernet controller, and the second application circuit 20 is a wireless local area network (WLAN) controller. It should be noted that the first application circuit 10 and the second application circuit 20 have different functions.

The MAC circuit 30 is coupled to the first application circuit 10 and the second application circuit 20, and used for encoding the first processed data Sp1 and the second processed data Sp2 so as to output encoded data Se. The PHY circuit 40 is coupled to the MAC circuit 30 to receive the encoded data Se so as to output the output data Sout to the transmission interface 50. According to an embodiment, the transmission interface 50 is a PCI Express interface. The PHY circuit 40 transmits the output data Sout to a chipset 60 via the transmission interface 50. For the convenience of illustration, the following embodiments are described by taking the PCI Express interface as an example of the transmission interface 50; however, the disclosure is not limited to this, and the data may also be transmitted via other types of transmission interfaces.

As shown in FIG. 1, the disclosure discloses a technique that a plurality of application circuits having different functions shares the same MAC circuit 30 and the same PHY circuit 40, so as to reduce the number of interfaces to be used. Moreover, in the disclosure application circuits sharing the PCI Express interface are integrated into the same control chip based on the definition that the PCI Express interface specifications can support a plurality of functions at the same time, that is, the first application circuit 10 and the second application circuit 20 are disposed in the same chip. As such, as compared with the conventional approach that each application circuit needs an MAC circuit and a PHY circuit for PCI Express, the area required by circuit layout or integrated circuit (IC) design is saved by sharing the MAC circuit 30 and the PHY circuit 40 through integration.

Furthermore, the upper-layer chipset 60 is notified during the device configuration of a PCI Express protocol that the device (i.e., the chip integrated with the first application circuit 10 and the second application circuit 20), has a plurality of functions. As such, different application circuits are integrated into the same control chip, and only one PCI Express port is used, so that the number of PCI Express ports to be used is reduced significantly.

In addition, according to an embodiment of the disclosure, in order to transmit the first processed data Sp1 and the second processed data Sp2 to the chipset smoothly, the MAC circuit 30 collectively encodes the first processed data Sp1 and the second processed data Sp2 so as to output the encoded data Se in compliance with PCI Express specifications, to the PHY circuit 40. For example, if the first application circuit 10 is a card reader and the second application circuit 20 is an Ethernet controller, the first processed data Sp1 is memory card access data, and the second processed data Sp2 is network transmission data. As the first application circuit 10 and the second application circuit 20 share the MAC circuit 30 and the PHY circuit 40 in the disclosure, the MAC circuit 30 and the PHY circuit 40 need to process the memory card access data and the network transmission data. After the upper-layer chipset 60 arranges a work schedule, the MAC circuit 30 will encode the memory card access data in a first time cycle, encode the network transmission data in a second time cycle, and transmit the encoded data Se to the PHY circuit 40. Next, the encoded data Se is converted by the PHY circuit 40 into an output signal that complies with the PCI Express interface, and then transmitted to the chipset 60. As such, the chipset 60 may receive the output data including the memory card access data and the network transmission data, and perform corresponding processing. In addition, it should be noted that in order to enable the MAC circuit 30 to collectively process the memory card access data and the network transmission data, according to an embodiment, an arbiter or a multiplexer may be disposed between the MAC circuit 30 and the application circuits (10 and 20), to output the memory card access data or the network transmission data to the MAC circuit 30 selectively.

Moreover, the integrated transmission circuit of the disclosure may also turn off power supplies of the application circuits according to the service condition of the circuit, so as to achieve power saving. For example, it is assumed that the first application circuit 10 is WLAN chip, and the second application circuit 20 is an Ethernet controller. When a user uses the WLAN chip to access a network, the first application circuit 10 is enabled, and the second application circuit 20 may turn off (or disable), a power supply thereof, for example, a PHY power supply in the second application circuit 20 is turned off, or clock signals are turned off, so as to achieve power management and power saving. It should be understood that the combination of the first application circuit 10 and the second application circuit 20 of the disclosure is not limited to the above description, and the application circuits may also be a combination of a display control chip, a DVD control chip, a sound effect control chip, a web cam control chip, or the like.

Figure 2:
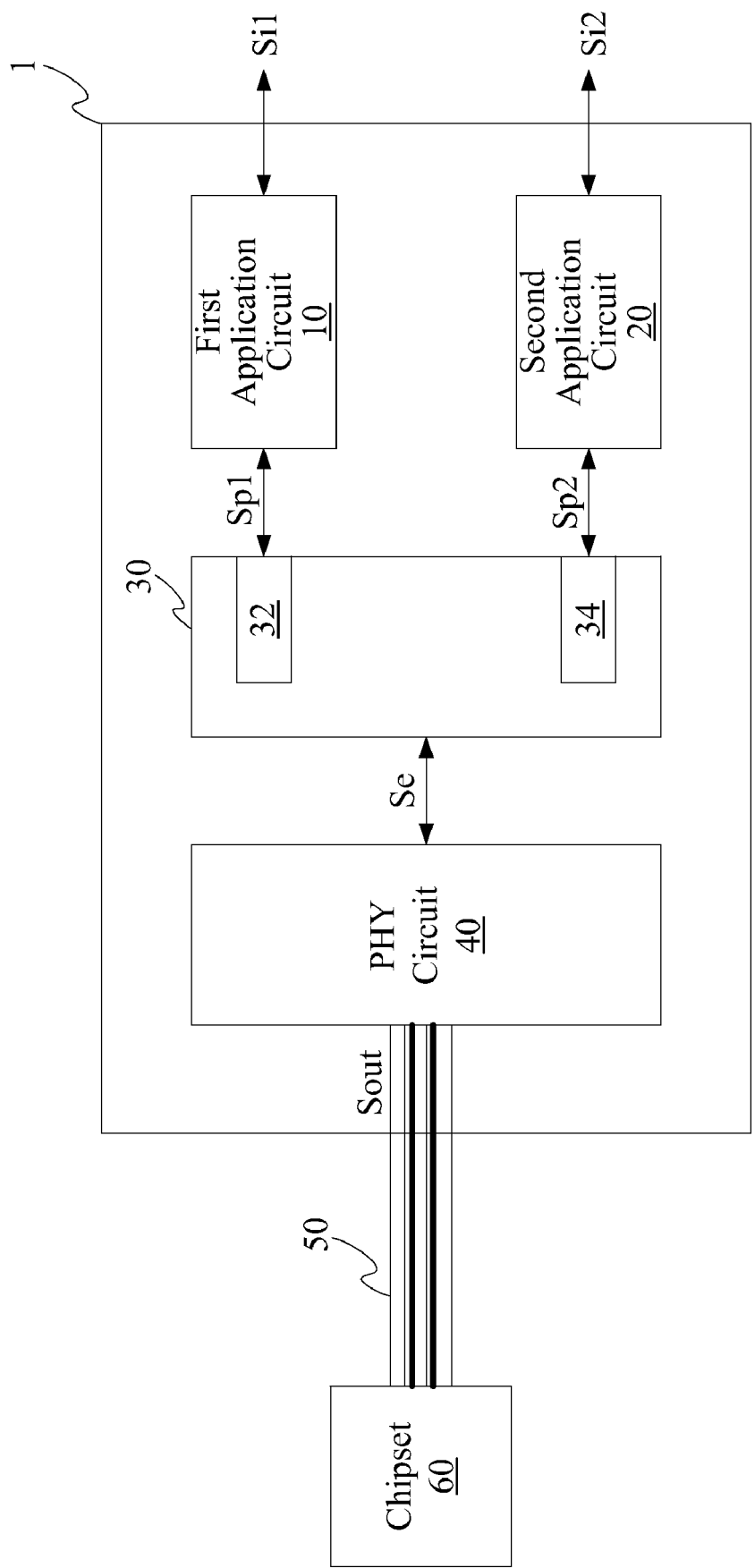
FIG. 2 is a schematic view of an integrated transmission circuit according to a second embodiment of the disclosure.

FIG. 2 is a schematic view of an integrated transmission circuit according to a second embodiment of the disclosure. In the second embodiment, in order to cooperate with the coupled first application circuit 10 and second application circuit 20 the MAC circuit 30 may include a first buffer 32 and a second buffer 34. The first buffer 32 is used for buffering the first processed data Sp1 output by the first application circuit 10, and the second buffer 34 is used for buffering the second processed data Sp2 output by the second application circuit 2. The MAC circuit 30 may use the first buffer 32 to read the first processed data Sp1 so as to encode the first processed data Sp1, and use the second buffer 34 to read the second processed data Sp2 so as to encode the second processed data Sp2, respectively. Moreover, if the MAC circuit 30 is coupled to more than two application circuits, the number of buffers to be disposed is increased according to the number of the application circuits. For example, if a third application circuit and a fourth application circuit are additionally provided and coupled to the MAC circuit 30, the MAC circuit 30 may further include a third buffer and a fourth buffer, and so on.

Figure 3:
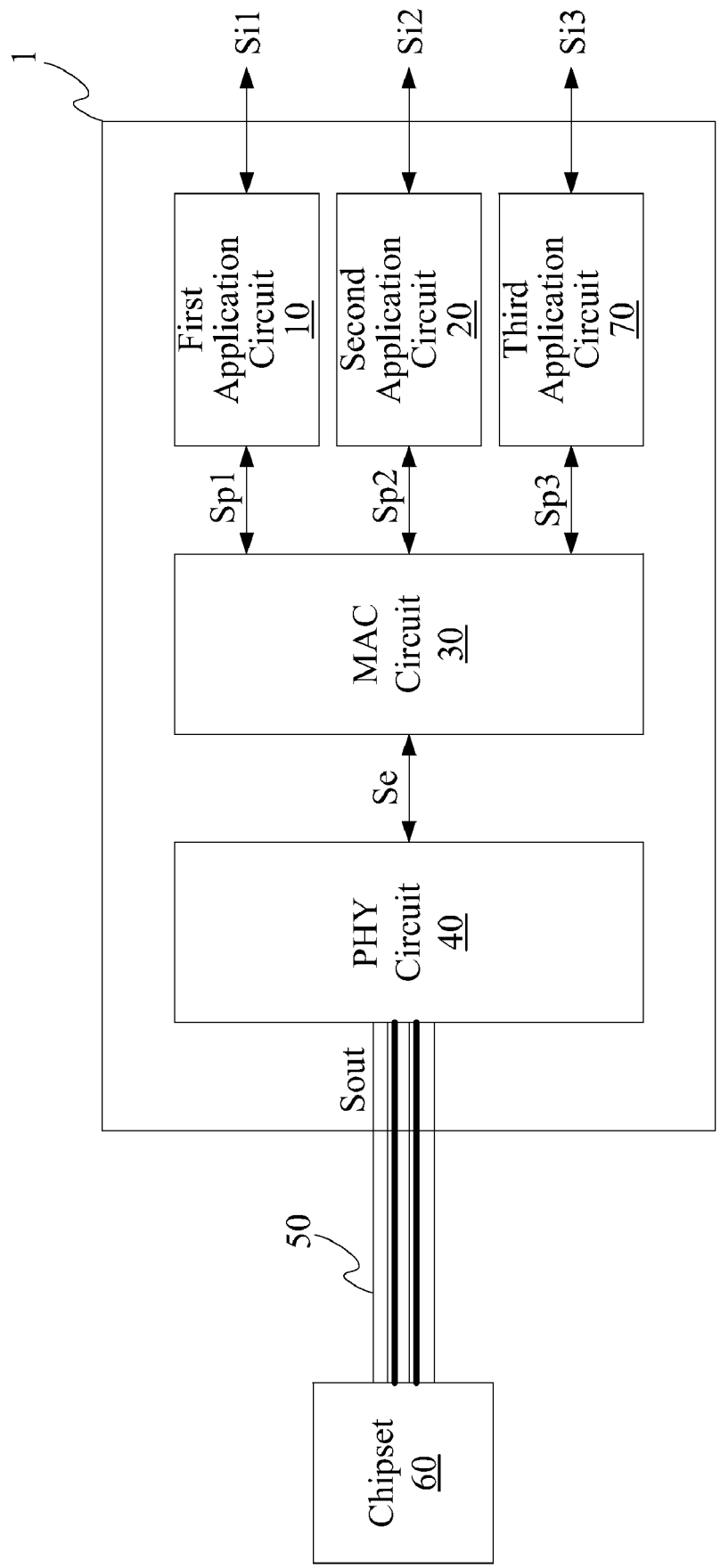
FIG. 3 is a schematic view of an integrated transmission circuit according to a third embodiment of the disclosure.

FIG. 3 is a schematic view of an integrated transmission circuit according to a third embodiment of the disclosure. In the third embodiment, a case involving more than two application circuits is illustrated. In the third embodiment, the integrated transmission circuit further includes a third application circuit 70. The third application circuit 70 is used for receiving and processing third data Si3 to output third processed data Sp3. The MAC circuit 30 is further coupled to the third application circuit 70, and collectively encodes the first processed data Sp1, the second processed data Sp2, and the third processed data Sp3 so as to output the encoded data Se to the PHY circuit 40. The first application circuit 10 is a card reader, the second application circuit 20 is a network controller, and the third application circuit 70 is a display controller. It is observable from the third embodiment that a plurality of application circuits is integrated into the same chip to share the MAC circuit 30 and the PHY circuit 40 through the integrated transmission circuit of the disclosure, and only one PCI Express port is used and coupled to the chipset.

Figure 4:
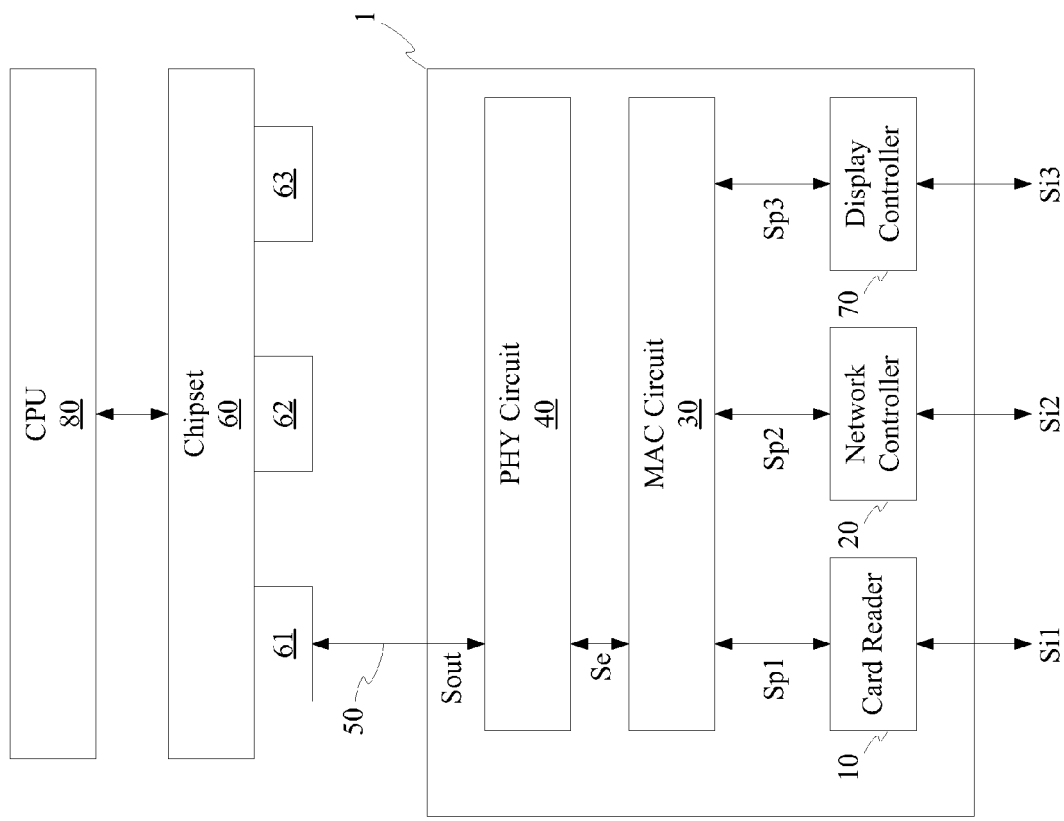
FIG. 4 is a schematic view of an integrated transmission circuit according to a fourth embodiment of the disclosure.

FIG. 4 is a schematic view of an integrated transmission circuit according to a fourth embodiment of the disclosure. The fourth embodiment is illustrated by taking a computer system architecture as an example, wherein the computer system has a central processing unit (CPU) 80. As shown in the figure, a chipset 60 has three PCI Express ports 61-63. In this embodiment, the PCI Express chipset 60 is a so-called root complex. An integrated transmission circuit 1 of the disclosure will integrate a first application circuit 10, a second application circuit 20, and a third application circuit 70, which are assumed to be a card reader, a network controller, and a display controller, respectively. In a computer system (for example, a notebook computer), the first application circuit 10 is a built-in card reader control chip for coupling to memory cards of different formats; the second application circuit 20 is a built-in network controller (an Ethernet chip and/or 802.11 WLAN chip), for coupling to a network line or receiving WLAN data; and the third application circuit 70 is a display controller for coupling to a display to generate an image control signal.

It is observable from FIG. 4 that a plurality of application circuits having different functions is integrated to share the MAC circuit 30 and the PHY circuit 40 through the integrated transmission circuit 1 of the disclosure, and only one PCI Express port 61 is used. Output data is transmitted to the chipset 60 via a PCI Express interface 50, and then transmitted by the chipset 60 to the CPU 80 in the upper layer; and the CPU 80 processes related data of the application circuits so as to enable the application circuits to operate normally.

Figure 5:
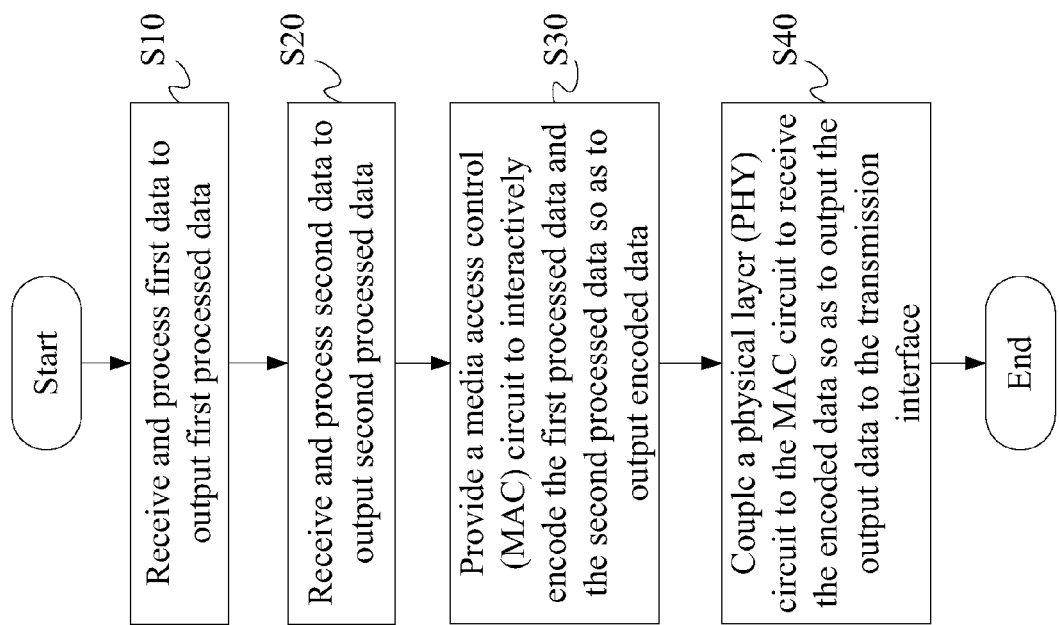
FIG. 5 is a flow chart of an integrated transmission method according to the disclosure.

FIG. 5 is a flow chart of an integrated transmission method according to the disclosure. The integrated transmission method of the disclosure is used for transmitting output data via a transmission interface, and includes the following steps:

In Step S10, first data is received and processed to output first processed data.

In Step S20, second data is received and processed to output second processed data.

In Step S30, an MAC circuit is provided to collectively encode the first processed data and the second processed data so as to output encoded data.

In Step S40, a PHY circuit is coupled to the MAC circuit to receive the encoded data so as to output the output data to the transmission interface.

In the Step S10, according to an embodiment, the first processed data is generated by a card reader, and the second processed data is generated by an Ethernet controller. Alternatively, the first processed data is generated by an Ethernet controller, and the second processed data is generated by a WLAN controller. Moreover, in the disclosure, the first processed data and the second processed data are generated by the same chip.

In the Step S30, according to an embodiment, the MAC circuit further includes: a first buffer, for buffering the first processed data; and a second buffer, for buffering the second processed data. The MAC circuit may use the first buffer to read the first processed data so as to encode the first processed data, and use the second buffer to read the second processed data so as to encode the second processed data. The output encoded data complies with specifications of the transmission interface, and if the transmission interface is a PCI Express interface, the encoded data output by the MAC circuit complies with PCI Express interface specifications.

In addition to the above steps, the method may further include: receiving and processing third data to output third processed data; and collectively encoding, by the MAC circuit, the first processed data, the second processed data, and the third processed data so as to output the encoded data. The first processed data is generated by a card reader, the second processed data is generated by a network controller, and the third processed data is generated by a display controller. Moreover, if the first data does not need to be processed, the integrated transmission method of the disclosure may further include ceasing to receive the first data and ceasing to process the first data, so as to achieve a power saving.

To sum up, the disclosure provides an integrated transmission circuit, which includes different types of application circuits, such as the card reader, the 10M/100M/Gigabit Ethernet controller, the WLAN controller, the display control chip, the DVD control chip, and the web cam control chip. The application circuits share the same MAC circuit and the same PHY circuit to transmit data to a chipset of a computer system. This being the case, the area required by circuit layout or IC design is reduced. Moreover, the integrated transmission circuit of the disclosure also has a power management function; such that when an application circuit does not need to be used the power supply thereof is turned off, so as to reduce power consumption.

The technical content of the disclosure has been disclosed through preferred embodiments, but is not intended to be limited thereto. Various variations and modifications made by those skilled in the art without departing from the spirit of the disclosure fall within the scope of the disclosure as defined by the appended claims.

What is claimed is:

1. An integrated transmission circuit, for transmitting output data via a transmission interface, the integrated transmission circuit comprising:
   a first application circuit, for receiving and processing first data to output first processed data;
   a second application circuit, for receiving and processing second data to output second processed data;
   a media access control (MAC) circuit, coupled to the first application circuit and the second application circuit, for encoding the first processed data and the second processed data so as to output encoded data; and
   a physical layer (PHY) circuit, coupled to the MAC circuit to receive the encoded data so as to output the output data to the transmission interface;
   wherein the first application circuit and the second application circuit have different functions; and the MAC circuit collectively encodes the first processed data and the second processed data so as to output the collectively encoded data to the PHY circuit.

2. The integrated transmission circuit according to claim 1, wherein the first application circuit is a card reader, and the second application circuit is an Ethernet controller.

3. The integrated transmission circuit according to claim 1, wherein the first application circuit is an Ethernet controller, and the second application circuit is a wireless local area network (WLAN) controller.

4. The integrated transmission circuit according to claim 1, wherein when the first application circuit is not used, the first application circuit is disabled.

5. The integrated transmission circuit according to claim 1, further comprising:
   a third application circuit, for receiving and processing third data to output third processed data;
   wherein the MAC circuit is further coupled to the third application circuit, and collectively encodes the first processed data, the second processed data, and the third processed data to so as output the collectively encoded data to the PHY circuit.

6. The integrated transmission circuit according to claim 1, wherein the first application circuit and the second application circuit are disposed in a same chip.

7. The integrated transmission circuit according to claim 1, wherein the MAC circuit comprises:
   a first buffer, for buffering the first processed data; and
   a second buffer, for buffering the second processed data;
   wherein the MAC circuit uses the first buffer to read the first processed data so as to encode the first processed data, and the MAC circuit uses the second buffer to read the second processed data so as to encode the second processed data.

8. The integrated transmission circuit according to claim 1, wherein the transmission interface is a Peripheral Component Interconnect Express (PCI Express) interface.

9. The integrated transmission circuit according to claim 1, wherein the PHY circuit transmits the output data to a chipset via the transmission interface.

10. The integrated transmission circuit according to claim 5, wherein the first application circuit is a card reader, the second application circuit is a network controller, and the third application circuit is a display controller.

11. An integrated transmission method, for transmitting output data via a transmission interface, the integrated transmission method comprising:
- receiving and processing first data to output first processed data;
- receiving and processing second data to output second processed data;
- providing a media access control (MAC) circuit to collectively encode the first processed data and the second processed data so as to output collectively encoded data; and
- coupling a physical layer (PHY) circuit to the MAC circuit to receive the collectively encoded data so as to output the output data to the transmission interface;

12. The integrated transmission method according to claim 11, wherein the first processed data is generated by a card reader, and the second processed data is generated by an Ethernet controller.

13. The integrated transmission method according to claim 11, wherein the first processed data is generated by an Ethernet controller and the second processed data is generated by a wireless local area network (WLAN) controller.

14. The integrated transmission method according to claim 11, further comprising:
- ceasing to receive the first data and ceasing to process the first data.

15. The integrated transmission method according to claim 11, further comprising:
- receiving and processing third data to output third processed data; and
- collectively encoding, by means of the MAC circuit, the first processed data, the second processed data, and the third processed data so as to output the collectively encoded data.

16. The integrated transmission method according to claim 11, wherein the first processed data and the second processed data are generated by the same chip.

17. The integrated transmission method according to claim 11, wherein the MAC circuit comprises:
- a first buffer, for buffering the first processed data; and
- a second buffer, for buffering the second processed data;
- wherein the MAC circuit uses the first buffer to read the first processed data so as to encode the first processed data, and the MAC circuit uses the second buffer to read the second processed data so as to encode the second processed data.

18. The integrated transmission method according to claim 11, wherein the transmission interface is a Peripheral Component Interconnect Express (PCI Express) interface.

19. The integrated transmission method according to claim 11, wherein the PHY circuit transmits the output data to a chipset via the transmission interface.

20. The integrated transmission method according to claim 15, wherein the first processed data is generated by a card reader, the second processed data is generated by a network controller, and the third processed data is generated by a display controller.

* * * * *